United States Patent
Min

(10) Patent No.: US 9,159,125 B2
(45) Date of Patent: Oct. 13, 2015

(54) HISTOGRAM STRETCHING APPARATUS AND METHOD

(71) Applicant: SAMSUNG ELECTRO-MECHANICS CO., LTD., Suwon, Gyunggi-do (KR)

(72) Inventor: Kyoung Joong Min, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 217 days.

(21) Appl. No.: 13/735,688

(22) Filed: Jan. 7, 2013

(65) Prior Publication Data

US 2014/0086485 A1    Mar. 27, 2014

(30) Foreign Application Priority Data

Sep. 25, 2012 (KR) .................. 10-2012-0106660

(51) Int. Cl.
 *G06K 9/00* (2006.01)
 *G06T 5/40* (2006.01)
 *G06T 5/00* (2006.01)

(52) U.S. Cl.
 CPC .. *G06T 5/40* (2013.01); *G06T 5/009* (2013.01)

(58) Field of Classification Search
 CPC ...... G06K 9/00664; G06T 5/009; G06T 5/40; G06T 5/002; G06T 5/003; G06T 5/007; G06T 5/008; G06T 5/0051; G06T 5/0085; G06T 5/20; G06T 2207/10016; G06T 2207/20008; G06T 2207/20192; H04N 5/243; H04N 5/23241; H04N 5/235; H04N 5/35527; H04N 9/643; H04N 9/67; H04N 9/68; H04N 19/00909

See application file for complete search history.

(56) References Cited

U.S. PATENT DOCUMENTS

| | | | | |
|---|---|---|---|---|
| 6,463,173 | B1 * | 10/2002 | Tretter | 382/168 |
| 7,359,572 | B2 * | 4/2008 | Liu et al. | 382/274 |
| 7,406,193 | B2 * | 7/2008 | Watanabe | 382/168 |
| 7,474,785 | B2 * | 1/2009 | Wu et al. | 382/168 |
| 7,835,588 | B2 * | 11/2010 | Parkkinen et al. | 382/274 |
| 8,009,224 | B2 * | 8/2011 | Umeda | 348/362 |
| 8,165,419 | B2 * | 4/2012 | Min et al. | 382/274 |
| 8,537,175 | B1 * | 9/2013 | Toderici et al. | 345/591 |
| 2009/0087092 | A1 | 4/2009 | Min et al. | |

FOREIGN PATENT DOCUMENTS

KR  2009-0032385 A  4/2009

* cited by examiner

*Primary Examiner* — Jose Couso

(74) *Attorney, Agent, or Firm* — NSIP Law

(57) ABSTRACT

There are provided a histogram stretching apparatus and a histogram stretching method. The histogram stretching apparatus includes: an image analyzing unit; a histogram generating unit; an extension level setting; and a histogram stretching unit, wherein the histogram generating unit adds a preset reference image level to the minimum image level to calculate the first image level and subtracts the preset reference image level from the maximum image level to calculate the second image level.

18 Claims, 7 Drawing Sheets

HISTOGRAM STRETCHING APPARATUS AND METHOD

CROSS-REFERENCE TO RELATED APPLICATIONS

This application claims the priority of Korean Patent Application No. 10-2012-0106660 filed on Sep. 25, 2012, in the Korean Intellectual Property Office, the disclosure of which is incorporated herein by reference.

BACKGROUND OF THE INVENTION

1. Field of the Invention

The present invention relates to a histogram stretching apparatus and a histogram stretching method.

2. Description of the Related Art

In general, image contrast refers to a difference between a bright area and a dark area in an image, that is, a magnitude of a contrast ratio therebetween. An image with a large contrast ratio may be considered to be an image having high contrast. An image having high contrast may be considered to be an image having an excellent degree of definition, due to a clear difference between bright areas and dark areas in the image. Therefore, when an image having low contrast is subjected to image processing so as to be converted into an image having high contrast, the degree of definition of the corresponding image is improved, thereby obtaining a high-quality image.

As an image processing technique for improving the degree of definition of an image having low contrast, a technology of stretching a histogram of an image is known. The frequency of an image having high contrast is widely distributed over each image level of the histogram. That is, the frequency of an image having high contrast is appropriately present, even in the bright area and the dark area, such that the frequency of the histogram of the image having high contrast is widely distributed over the overall image level. On the other hand, a difference between bright areas and dark areas in an image having low contrast is small, such that the frequency of the histogram is distributed over a relatively narrower area of the image level. When the frequency distributed over the narrow area in the histogram of the image having low contrast is corrected so as to be widely distributed, an image having a large difference between the bright areas and the dark areas thereof may be generated. As such, widely expanding the frequency distribution of a histogram may be referred to as histogram stretching.

In order to calculate the histogram, there is a need to calculate the frequency of the input image level. In order to calculate the frequency of the input image and store the calculated histogram, an operation logic and storage device in proportion to the size and depth of the input image is required. That is, when the input image is an 8-bit image of 640×480 size, $640 \times 480 \times 2^8$ registers are required, such that the size of the storage device may be increased and the number of operations of the operation logic may be increased.

To resolve the above defects, a method of reducing the size of the input image at a certain ratio or reducing the depth information thereof has been proposed, but may cause distortion of the input image, such that accurate histogram calculation results may not be derived therefrom.

Patent Document 1 of the following Related Art Documents relates to an apparatus and a method of stretching a histogram capable of improving contrast of an image. However, Patent Document 1 does not disclose a method of reducing a size of a storage device and a number of operations of operation logic.

RELATED ART DOCUMENT (Patent Document 1) KR Patent Laid-Open Publication No. 10-2009-0032385

SUMMARY OF THE INVENTION

An aspect of the present invention provides a histogram stretching apparatus and a histogram stretching method, capable of improving contrast of an input image by only calculating a portion of a histogram of the input image rather than calculating the overall histogram of the input image so as to allow for reductions in a size of a storage device and a number of operations of an operation logic without distorting the input image.

According to an aspect of the present invention, there is provided a histogram stretching apparatus, including: an image analyzing unit receiving an input image to calculate a minimum image level and a maximum image level; a histogram generating unit generating a histogram of frequencies of image levels in a first section from the minimum image level to a first image level and a second section from a second image level to the maximum image level; an extension level setting unit comparing the frequencies of the image levels in the first section and the second section with a preset reference frequency to set an extension level; and a histogram stretching unit correcting the image levels of the input image according to the extension level, wherein the histogram generating unit adds a preset reference image level to the minimum image level to calculate the first image level and subtracts the preset reference image level from the maximum image level to calculate the second image level.

The extension level may include a minimum extension level and a maximum extension level, and the extension level setting unit may include: a minimum extension level setting unit comparing the frequencies of the image levels in the first section with the reference frequency to set the minimum extension level; and a maximum extension level setting unit comparing the frequencies of the image levels in the second section with the reference frequency to set the maximum extension level.

The reference frequency may include a preset first reference frequency and a preset second reference frequency, the minimum extension level setting unit may compare the frequencies of the image levels in the first section with the first reference frequency to set the minimum extension level, and the maximum extension level setting unit may compare the frequencies of the image levels in the second section with the second reference frequency to set the maximum extension level.

The histogram stretching unit may correct the image levels of the input image according to the minimum extension level and the maximum extension level.

The minimum extension level setting unit may set an image level having the highest frequency among image levels having frequencies higher than the reference frequency in the first section as the minimum extension level when the image levels having frequencies higher than the reference frequency are present in the first section, and may set the first image level as the minimum extension level when an image level having a higher frequency than the reference frequency among the image levels in the first section is not present, and the maximum extension level setting unit may set an image level having the lowest frequency among image levels having frequencies higher than the reference frequency in the second section as the maximum extension level when the image levels having frequencies higher than the reference frequency are present in the second section, and may set the second image level as the maximum extension level when an image level having a higher frequency than the reference frequency among the image levels in the second section is not present.

In addition, the minimum extension level setting unit may set an image level having the highest frequency among image levels having frequencies higher than the first reference frequency in the first section as the minimum extension level when the image levels having frequencies higher than the first reference frequency are present in the first section, and may set the first image level as the minimum extension level when an image level having a higher frequency than the first reference frequency among the image levels in the first section is not present, and the maximum extension level setting unit may set an image level having the lowest frequency among image levels having frequencies higher than the second reference frequency in the second section as the maximum extension level when the image levels having frequencies higher than the second reference frequency are present in the second section, and may set the second image level as the maximum extension level when an image level having a higher frequency than the second reference frequency among the image levels in the second section is not present.

The histogram generating unit may include: a section setting unit setting the first section from the minimum image level to the first image level calculated by adding the reference image level to the minimum image level, and the second section from the second image level calculated by subtracting the reference image level from the maximum image level to the maximum image level; and a section histogram generating unit calculating the frequencies of the image levels in the first section and the second section in the input image to generate the histogram of the frequencies of the image levels in the first section and the second section.

The reference image level may include a preset first reference image level and a preset second reference image level, and the section setting unit may set the first section from the minimum image level to the first image level calculated by adding the first reference image level to the minimum image level, and the second section from the second image level calculated by subtracting the second reference image level from the maximum image level to the maximum image level.

The first section and the second section may include different image levels.

According to another aspect of the present invention, there is provided a histogram stretching method, including: calculating a minimum image level and a maximum image level of an input image; generating a histogram of frequencies of image levels in a first section from the minimum image level to a first image level and a second section from a second image level to the maximum image level; comparing the frequencies of the image levels in the first section and the second section with a preset reference frequency and setting an extension level; and correcting the image levels of the input image according to the extension level and generating an output image, wherein in the generating of the histogram, a preset reference image level is added to the minimum image level to calculate the first image level and the reference image level is subtracted from the maximum image level to calculate the second image level.

The extension level includes a minimum extension level and a maximum extension level, and the setting of the extension level may includes: comparing the frequencies of the image levels in the first section with the reference frequency and setting the minimum extension level; and comparing the frequencies of the image levels in the second section with the reference frequency and setting the maximum extension level.

The reference frequency may include a preset first reference frequency and a preset second reference frequency, and in the setting of the minimum extension level, the frequencies of the image levels in the first section may be compared with the first reference frequency to set the minimum extension level, and in the setting of the maximum extension level, the frequencies of the image levels in the second section may be compared with the second reference frequency to set the maximum extension level.

In the generating of the output image, the image levels of the input image may be corrected according to the minimum extension level and the maximum extension level.

In the setting of the minimum extension level, an image level having the highest frequency among image levels having frequencies higher than the reference frequency in the first section may be set as the minimum extension level when the image levels having frequencies higher than the reference frequency are present in the first section, and the first image level may be set as the minimum extension level when an image level having a higher frequency than the reference frequency among the image levels in the first section is not present, and in the setting of the maximum extension level, an image level having the lowest frequency among image levels having frequencies higher than the reference frequency in the second section may be set as the maximum extension level when the image levels having frequencies higher than the reference frequency are present in the second section, and the second image level may be set as the maximum extension level when an image level having a higher frequency than the reference frequency among the image levels in the second section is not present.

In the setting of the minimum extension level, an image level having the highest frequency among image levels having frequencies higher than the first reference frequency in the first section may be set as the minimum extension level when the image levels having frequencies higher than the first reference frequency are present in the first section, and the first image level may be set as the minimum extension level when an image level having a higher frequency than the first reference frequency among the image levels in the first section is not present, and in the setting of the maximum extension level, an image level having the lowest frequency among image levels having frequencies higher than the second reference frequency in the second section may be set as the maximum extension level when the image levels having frequencies higher than the second reference frequency are present in the second section, and the second image level may be set as the maximum extension level when an image level having a higher frequency than the second reference frequency among the image levels in the second section is not present.

The generating of the histogram may include: setting the first section from the minimum image level to the first image level calculated by adding the reference image level to the minimum image level, and the second section from the second image level calculated by subtracting the reference image level from the maximum image level to the maximum image level; and generating the histogram of the frequencies of the image levels in the first section and the second section by calculating the frequencies of the image levels in the first section and the second section in the input image.

The reference image level may include a preset first reference image level and a preset second reference image level, and in the setting of the first section and the second section, the first section from the minimum image level to the first image level calculated by adding the first reference image level to the minimum image level and the second section from the second image level calculated by subtracting the second reference image level from the maximum image level to the maximum image level may be set.

The first section and the second section may include different image levels.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
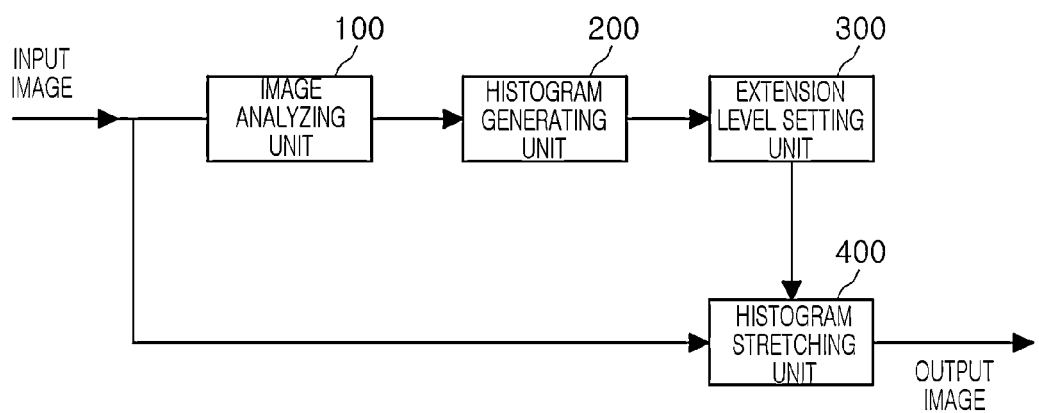
FIGS. 1 and 2 are block diagrams illustrating a histogram stretching apparatus according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
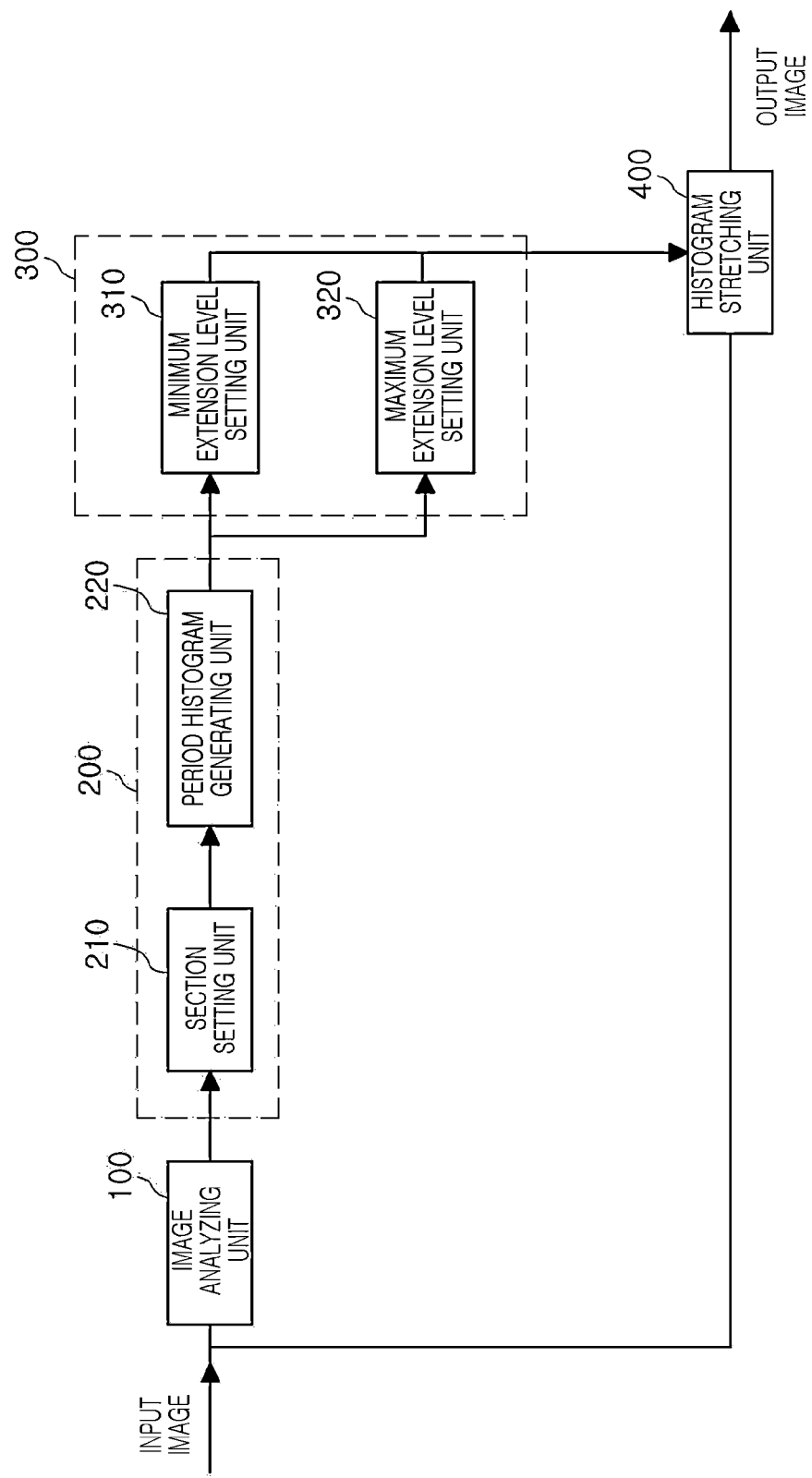

FIGS. 1 and 2 are block diagrams illustrating a histogram stretching apparatus according to an embodiment of the present invention.

Referring to FIG. 1, the histogram stretching apparatus according to the embodiment of the present invention may include an image analyzing unit 100, a histogram generating unit 200, an extension level setting unit 300, and a histogram stretching unit 400.

The image analyzing unit 100 may receive an input image to calculate a minimum image level and a maximum image level. The minimum image level may mean the lowest image contrast level among image levels of the input image and the maximum image level may mean the highest image contrast level among the image levels of the input image.

The histogram generating unit 200 may add a preset reference image level to the minimum image level to calculate a first image level and may subtract the preset reference image level from the maximum image level to calculate a second image level. Further, the histogram generating unit 200 may generate a histogram of frequencies of image levels in a first section from the minimum image level to the first image level and a second section from the second image level to the maximum image level.

The extension level setting unit 300 may compare the frequencies of the image levels in the first section and the second section with a preset reference frequency to set extension levels. The extension levels are image levels included in the first section and the second section and refer to levels to be extended to specific image levels.

The histogram stretching unit 400 may correct the image levels of the input image according to the extension levels. In detail, the image levels of the input image may be corrected by extending the extension levels to the specific image levels, to thereby generate an output image.

Figure 3:
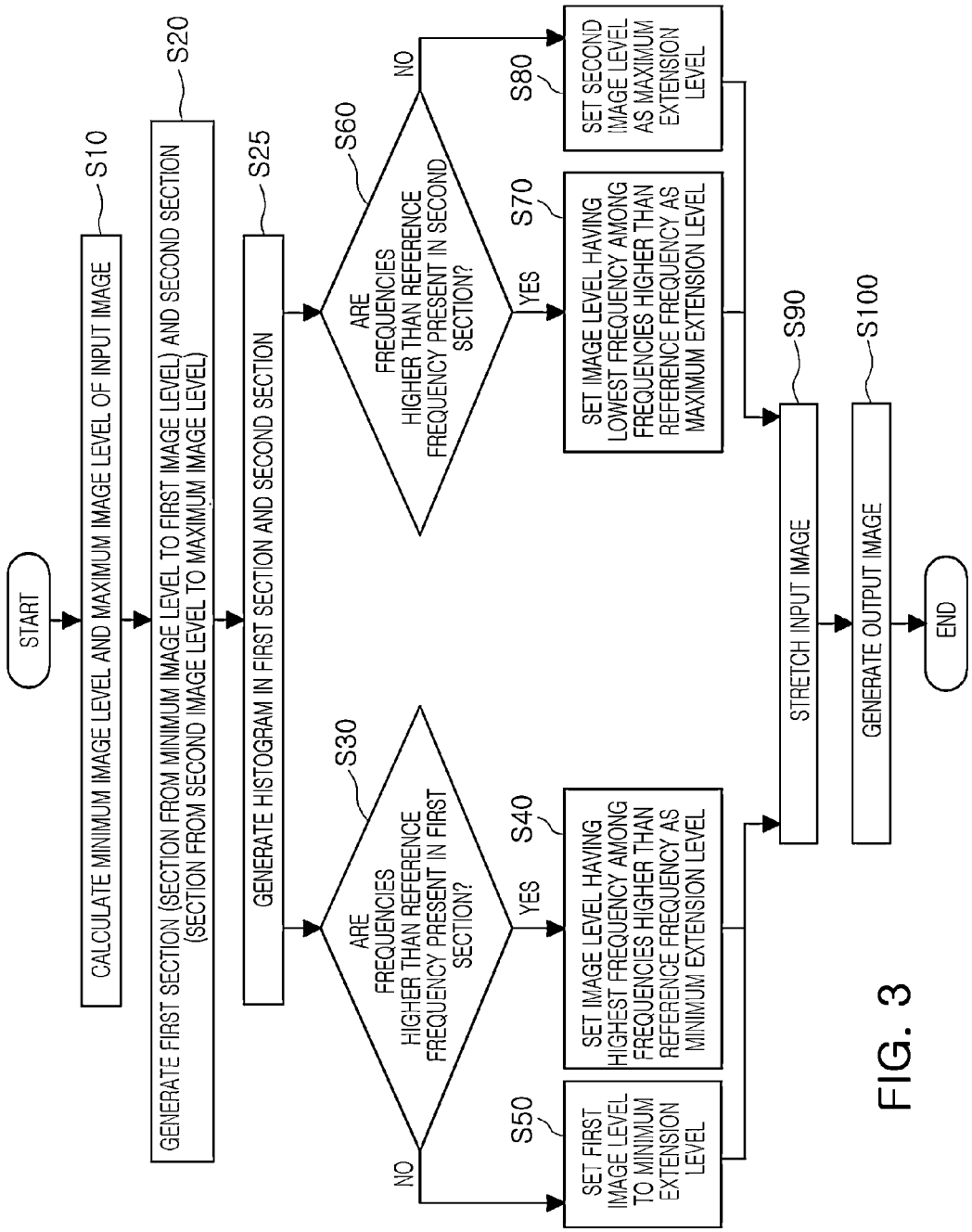
FIG. 3 is a flowchart illustrating a histogram stretching method according to an embodiment of the present invention.

FIG. 2 is a block diagram illustrating a histogram stretching apparatus according to the embodiment of the present invention and FIG. 3 is a flow chart illustrating a histogram stretching method according to an embodiment of the present invention. The histogram stretching apparatus and histogram stretching method according to the embodiment of the present invention will be described in detail with reference to FIGS. 2 and 3.

As described above, the image analyzing unit 100 may receive the input image to calculate the minimum image level and the maximum image level (S10).

The histogram generating unit 200 may include a section setting unit 210 and a section histogram generating unit 220.

The section setting unit 210 may add the reference image level to the minimum image level to calculate the first image level and may set the section from the minimum image level to the first image level as the first section. Further, the section setting unit 210 may subtract the reference image level from the maximum image level to calculate the second image level and may set the section from the second image level to the maximum image level as the second section. In this case, the reference image level may be controlled so that the first section and the second section have different image levels.

The intervals of first section and the second section may be set to be different. That is, the reference image level may include a first reference image level for setting the first section and a second reference image level for setting the second section.

That is, a section setting unit 210 may add the first reference image level to the minimum image level to calculate the first image level and set the section from the minimum image level to the first image level as the first section. Further, the section setting unit 210 may subtract the second reference image level from the maximum image level to calculate the second image level and set the section from the second image level to the maximum image level as the second section. Therefore, the first section and the second section can be set in different sections (S20).

A section histogram setting unit may calculate the frequencies of the image levels in the first section and the second section that are generated by the section setting unit 210 to generate the histogram of the image levels in the first section and the second section (S25).

The extension level setting unit 300 may include a minimum extension level setting unit 310 and a maximum extension level setting unit 320. The minimum extension level is an image level that is included in the first section and extended to a first specific image level, and the maximum extension level is an image level that is included in the second section and extended to a second specific image level. In this case, the first specific image level may be lower than the second specific image level.

The minimum extension level setting unit 310 may compare the frequencies of the image levels in the first section with the reference frequency to set the minimum extension level (S30). Specifically, the minimum extension level setting unit 310 may set an image level having the highest frequency among image levels having frequencies higher than the reference frequency in the first section as the minimum extension level, when the image levels having frequencies higher than the reference frequency are present in the first section (S40). However, when an image level having a higher frequency than the reference frequency among the image levels in the first section is not present, the first image level may be set to be the minimum extension level (S50).

The maximum extension level setting unit 320 may compare the frequencies of the image levels in the second section with the reference frequency to set the maximum extension level (S60). Specifically, the maximum extension level setting unit 320 may set an image level having the lowest frequency among image levels having frequencies higher than the reference frequency in the second section as the maximum extension level, when the image levels having frequencies higher than the reference frequency are present in the second section (S70). However, when an image level having a higher frequency than the reference frequency among the image levels in the second section is not present, the second image level may be set to be the maximum extension level (S80).

The foregoing reference frequency may be set to be different according to the first section and the second section. That is, the reference frequency may include the first reference frequency compared to the frequencies in the first section and the second reference frequency compared to the frequencies in the second section.

In this case, the minimum extension level setting unit 310 may set an image level having the highest frequency among image levels having frequencies higher than the first reference frequency in the first section as the minimum extension level, when the image levels having frequencies higher than the first reference frequency are present in the first section, and set the first image level as the minimum extension level when an image level having a higher frequency than the first reference frequency among the image levels in the first section is not present. The maximum extension level setting unit 320 may set an image level having the lowest frequency among image levels having frequencies higher than the second reference frequency in the second section as the maximum extension level, when the image levels having frequencies higher than the second reference frequency are present in the second section, and set the second image level as the maximum extension level when an image level having a higher frequency than the reference frequency among the image levels in the second section is not present.

The histogram stretching unit 400 may correct the image levels of the input image according to the minimum extension level and the maximum extension level. In detail, the image levels of the input image can be corrected by extending the minimum extension level to the first specific image level and the maximum extension level to the second specific image level (S90), thereby generating the output image (S100).

The following Equation 1 is an Equation for stretching the image level of the input image to an image level of the output image. In the following Equation 1, OutImage is the image level of the output image, InImg is the image level of the input image, $Final_L$ is the first specific image level, $Final_H$ is the second specific image level, Lpoint is the minimum extension level, and Hpoint is the maximum extension level.

$$OutImg = (Final_H - Final_L) * \frac{InImg + Lpoint}{Hpoint - Lpoint} + Final_L \quad \text{[Equation 1]}$$

Figure 4:
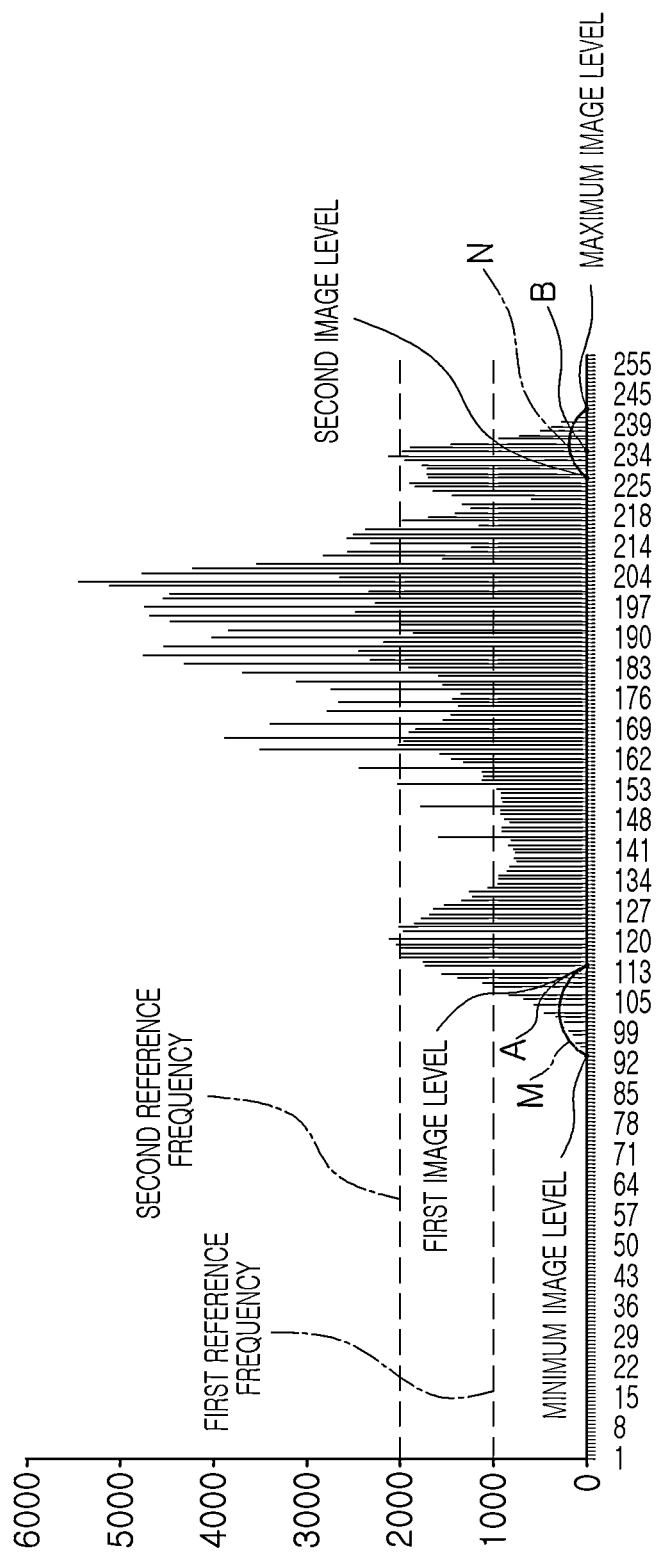
FIG. 4 is a histogram of an input image provided to the histogram stretching apparatus according to the embodiment of the present invention.
Figure 5:
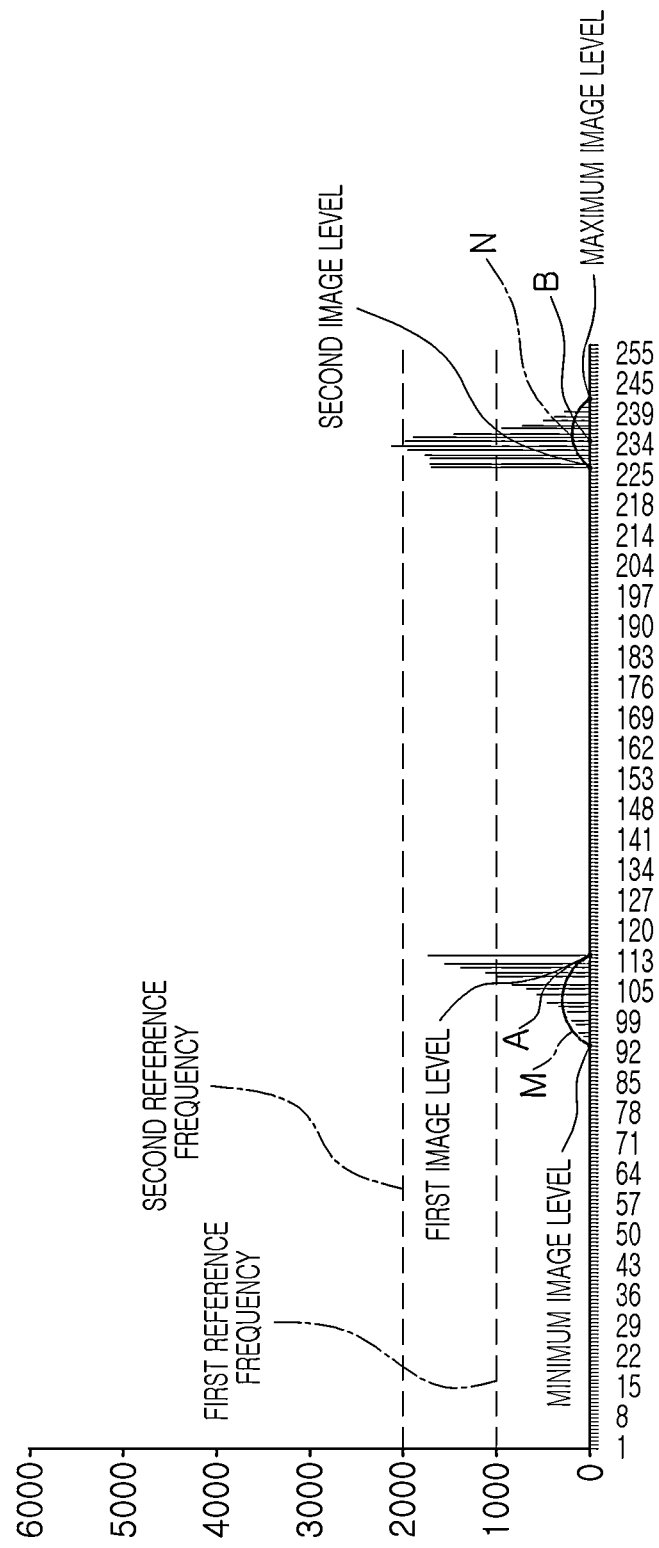
FIG. 5 is a histogram generated by a histogram generating unit of the histogram stretching apparatus according to the embodiment of the present invention.
Figure 6:
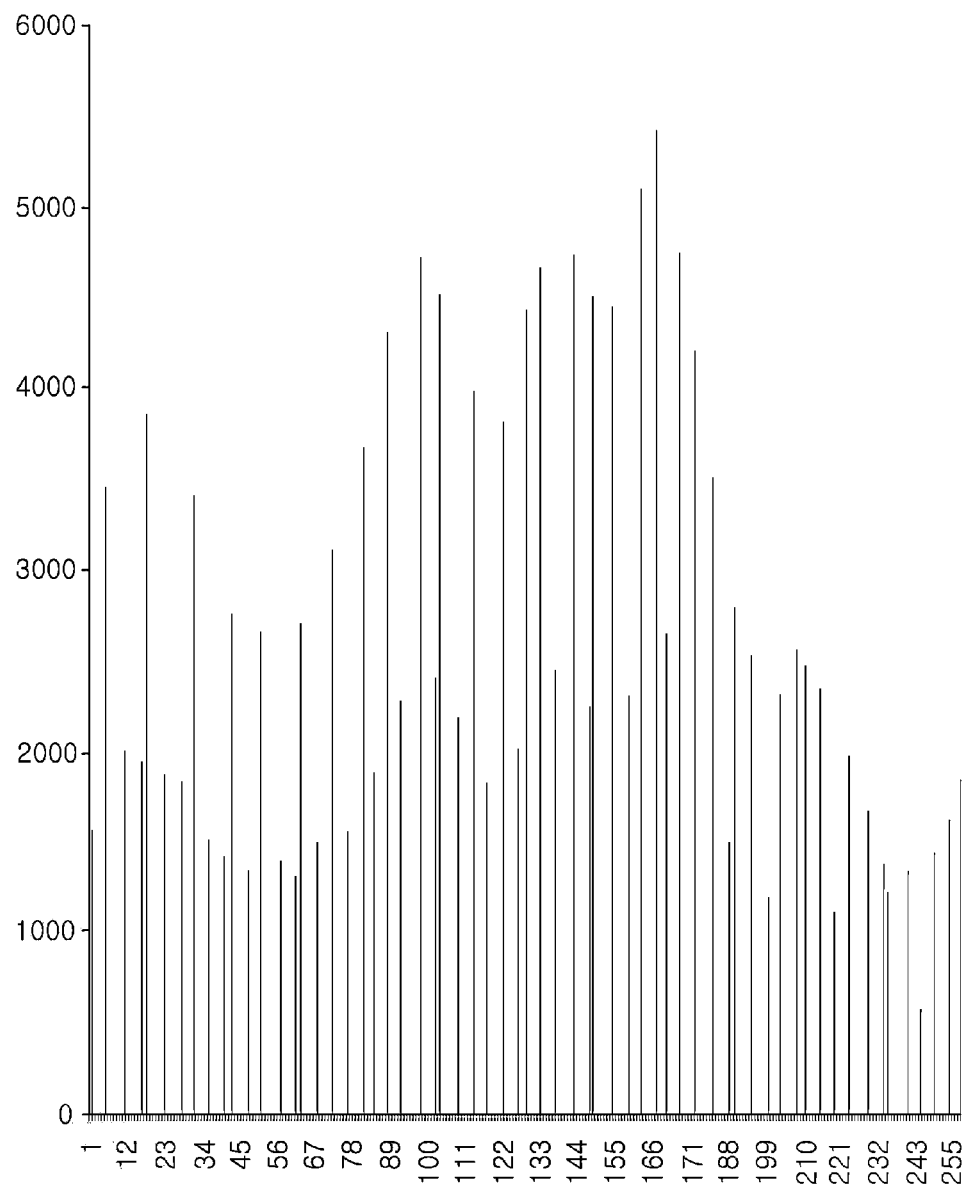
FIG. 6 is a histogram of an output image generated by the histogram stretching apparatus according to the embodiment of the present invention.

FIG. 4 is a histogram of an input image provided to the histogram stretching apparatus according to the embodiment of the present invention. FIG. 5 is a histogram generated by the histogram generating unit 200 of the histogram stretching apparatus according to the embodiment of the present invention. FIG. 6 is a histogram of an output image generated by the histogram stretching apparatus according to the embodiment of the present invention.

An operation of the histogram stretching apparatus according to the embodiment of the present invention will be described in more detail with reference to FIGS. 4 to 6. Referring to FIG. 4, the image analyzing unit 100 calculating the minimum image level and the maximum input image level may calculate the minimum image level of about 92 and the maximum image level of about 242.

The section setting unit 210 may add the preset first reference image level (M: about 19) to the minimum image level to calculate the first image level (about 111) and set a section from an image level of about 92 to the image level of about 111 as the first section. Further, the section setting unit 210 may subtract the preset second reference image level (N: about 15) from the maximum image level to calculate the second image level (about 227) and set a section from the image level of about 227 to an image level of about 242 as the second section.

The minimum extension level setting unit 310 may compare the frequencies of the image levels in the first section with a first reference frequency (about 1000) to set the minimum extension level. In detail, image levels having frequencies (about 92 to about 111) higher than the first reference frequency (about 1000) are present in the first section, such that the image level having the highest frequency of about 111 may be set as a minimum extension level A.

The maximum extension level setting unit 320 may compare the frequencies of the image levels in the second section with a second reference frequency (about 1800) to set the maximum extension level. In detail, image levels having frequencies (about 227 to about 242) higher than the second reference frequency (about 1800) are present in the second section, such that the image level having the lowest frequency (about 227) among the image levels having the frequencies higher than the second reference frequency is set as a maximum extension level B.

The section histogram generating unit 220 may generate the histogram of the first section and the second section. The generated histogram is illustrated in FIG. 4.

The histogram stretching unit 400 extends the minimum extension level as the first specific image level and the maximum extension level as the second specific image level. Referring to FIG. 4C, the first specific image level is set to be 0 and the second specific image level is set to be 255, such that the minimum extension level and the maximum extension level may be extended.

Figure 7A:
FIGS. 7A and 7B are diagrams illustrating simulation results obtained through histogram stretching according to the embodiment of the present invention.
Figure 7B:

FIGS. 7A and 7B are diagrams illustrating simulation results obtained through histogram stretching according to the embodiment of the present invention. FIG. 7A is a diagram illustrating the input image according to the embodiment of the present invention and FIG. 7B is a diagram illustrating the output image according to the embodiment of the present invention.

Referring to FIGS. 7A and 7B, it can be appreciated that the contrast of the output image is improved than that of the input image.

As set forth above, according to the embodiment of the present invention, the size and volume of the storage device can be reduced and manufacturing costs thereof can be reduced, by only calculating a portion of the histogram of the input image rather than calculating the overall histogram of the input image.

Further, power consumption and heat generation can be reduced, by reducing the number of operations of the operation logic.

While the present invention has been shown and described in connection with the embodiments, it will be apparent to those skilled in the art that modifications and variations can be made without departing from the spirit and scope of the invention as defined by the appended claims.

What is claimed is:

1. A non-statutory computer-readable medium comprising executable instructions which cause a histogram stretching apparatus to perform following functions of:
    receiving an input image to calculate a minimum image level and a maximum image level;
    generating a histogram of frequencies of image levels in a first section ranging from the minimum image level to a first image level and a second section ranging from a second image level to the maximum image level;
    comparing the frequencies of the image levels in the first section and the second section with a reference frequency to set an extension level; and
    correcting the image levels of the input image according to the extension level,
    wherein a reference image level is added to the minimum image level to calculate the first image level and subtracted from the maximum image level to calculate the second image level,
    wherein each of the first section and the second section is only a portion of a total section which ranges from the minimum image level to the maximum image level.

2. The non-statutory computer-readable medium of claim 1, wherein the extension level includes a minimum extension level and a maximum extension level, and wherein the medium further comprises instructions which cause the histogram stretching apparatus to perform functions of:
    comparing the frequencies of the image levels in the first section with the reference frequency to set the minimum extension level; and
    comparing the frequencies of the image levels in the second section with the reference frequency to set the maximum extension level.

3. The non-statutory computer-readable medium of claim 2, wherein the reference frequency includes a first reference frequency and a second reference frequency,
    the function of comparing the frequencies of the image levels in the first section compares the frequencies of the image levels in the first section with the first reference frequency to set the minimum extension level, and
    the function of comparing the frequencies of the image levels in the second section compares the frequencies of the image levels in the second section with the second reference frequency to set the maximum extension level.

4. The non-statutory computer-readable medium of claim 2, wherein the function of correcting the image levels of the input image corrects the image levels of the input image according to the minimum extension level and the maximum extension level.

5. The non-statutory computer-readable medium of claim 2, wherein the function of comparing the frequencies of the image levels in the first section sets an image level having the highest frequency among image levels having frequencies higher than the reference frequency in the first section as the minimum extension level when the image levels having frequencies higher than the reference frequency are present in the first section, and sets the first image level as the minimum extension level when an image level having a higher frequency than the reference frequency among the image levels in the first section is not present, and
    the function of comparing the frequencies of the image levels in the second section sets an image level having the lowest frequency among image levels having frequencies higher than the reference frequency in the second section as the maximum extension level when the image levels having frequencies higher than the reference frequency are present in the second section, and sets the second image level as the maximum extension level when an image level having a higher frequency than the reference frequency among the image levels in the second section is not present.

6. The non-statutory computer-readable medium of claim 3, wherein the function of comparing the frequencies of the image levels in the first section further sets an image level having the highest frequency among image levels having frequencies higher than the first reference frequency in the first section as the minimum extension level when the image levels having frequencies higher than the first reference frequency are present in the first section, and sets the first image level as the minimum extension level when an image level having a higher frequency than the first reference frequency among the image levels in the first section is not present, and
    the function of comparing the frequencies of the image levels in the second section further sets an image level having the lowest frequency among image levels having frequencies higher than the second reference frequency in the second section as the maximum extension level when the image levels having frequencies higher than the second reference frequency are present in the second section, and sets the second image level as the maximum extension level when an image level having a higher frequency than the second reference frequency among the image levels in the second section is not present.

7. The non-statutory computer-readable medium of claim 1, wherein the function of generating the histogram of frequencies includes functions of:
    setting the first section from the minimum image level to the first image level calculated by adding the reference image level to the minimum image level, and the second section from the second image level calculated by subtracting the reference image level from the maximum image level to the maximum image level; and
    calculating the frequencies of the image levels in the first section and the second section in the input image to generate the histogram of the frequencies of the image levels in the first section and the second section.

8. The non-statutory computer-readable medium of claim 7, wherein the reference image level includes a first reference image level and a second reference image level, and
    the function of setting the first section sets the first section from the minimum image level to the first image level calculated by adding the first reference image level to the minimum image level, and the second section from the second image level calculated by subtracting the second reference image level from the maximum image level to the maximum image level.

9. The non-statutory computer-readable medium of claim 1, wherein the first section and the second section include different image levels.

10. A histogram stretching method, comprising:
calculating, by a histogram stretching apparatus, a minimum image level and a maximum image level of an input image;
generating, by the histogram stretching apparatus, a histogram of frequencies of image levels in a first section ranging from the minimum image level to a first image level and a second section ranging from a second image level to the maximum image level;
comparing, by the histogram stretching apparatus, the frequencies of the image levels in the first section and the second section with a reference frequency and setting an extension level; and
correcting, by the histogram stretching apparatus, the image levels of the input image according to the extension level and generating an output image,
wherein in the generating of the histogram, a reference image level is added to the minimum image level to calculate the first image level and the reference image level is subtracted from the maximum image level to calculate the second image level,
wherein each of the first section and the second section is only a portion of a total section which ranges from the minimum image level to the maximum image level.

11. The histogram stretching method of claim 10, wherein the extension level includes a minimum extension level and a maximum extension level, and
the setting of the extension level includes:
comparing, by the histogram stretching apparatus, the frequencies of the image levels in the first section with the reference frequency and setting the minimum extension level; and
comparing, by the histogram stretching apparatus, the frequencies of the image levels in the second section with the reference frequency and setting the maximum extension level.

12. The histogram stretching method of claim 11, wherein the reference frequency includes a first reference frequency and a second reference frequency, and
in the setting of the minimum extension level, the frequencies of the image levels in the first section are compared with the first reference frequency to set the minimum extension level, and
in the setting of the maximum extension level, the frequencies of the image levels in the second section are compared with the second reference frequency to set the maximum extension level.

13. The histogram stretching method of claim 11, wherein in the generating of the output image,
the image levels of the input image are corrected according to the minimum extension level and the maximum extension level.

14. The histogram stretching method of claim 11, wherein in the setting of the minimum extension level, an image level having the highest frequency among image levels having frequencies higher than the reference frequency in the first section is set as the minimum extension level when the image levels having frequencies higher than the reference frequency are present in the first section, and the first image level is set as the minimum extension level when an image level having a higher frequency than the reference frequency among the image levels in the first section is not present, and
in the setting of the maximum extension level, an image level having the lowest frequency among image levels having frequencies higher than the reference frequency in the second section is set as the maximum extension level when the image levels having frequencies higher than the reference frequency are present in the second section, and the second image level is set as the maximum extension level when an image level having a higher frequency than the reference frequency among the image levels in the second section is not present.

15. The histogram stretching method of claim 12, wherein in the setting of the minimum extension level, an image level having the highest frequency among image levels having frequencies higher than the first reference frequency in the first section is set as the minimum extension level when the image levels having frequencies higher than the first reference frequency are present in the first section, and the first image level is set as the minimum extension level when an image level having a higher frequency than the first reference frequency among the image levels in the first section is not present, and
in the setting of the maximum extension level, an image level having the lowest frequency among image levels having frequencies higher than the second reference frequency in the second section is set as the maximum extension level when the image levels having frequencies higher than the second reference frequency are present in the second section, and the second image level is set as the maximum extension level when an image level having a higher frequency than the second reference frequency among the image levels in the second section is not present.

16. The histogram stretching method of claim 10, wherein the generating of the histogram includes:
setting, by the histogram stretching apparatus, the first section from the minimum image level to the first image level calculated by adding the reference image level to the minimum image level, and the second section from the second image level calculated by subtracting the reference image level from the maximum image level to the maximum image level; and
generating, by the histogram stretching apparatus, the histogram of the frequencies of the image levels in the first section and the second section by calculating the frequencies of the image levels in the first section and the second section in the input image.

17. The histogram stretching method of claim 16, wherein the reference image level includes a first reference image level and a second reference image level, and
in the setting of the first section and the second section, the first section from the minimum image level to the first image level calculated by adding the first reference image level to the minimum image level and the second section from the second image level calculated by subtracting the second reference image level from the maximum image level to the maximum image level are set.

18. The histogram stretching method of claim 10, wherein the first section and the second section include different image levels.

* * * * *